Jan. 21, 1964  A. DRESDNER  3,118,543
INDUSTRIAL JOINT FURNITURE KIT
Filed May 26, 1961  2 Sheets-Sheet 2
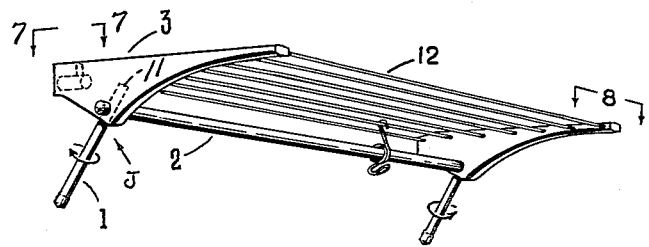
Fig.4
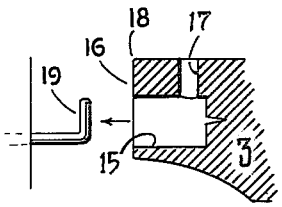
Fig.7a
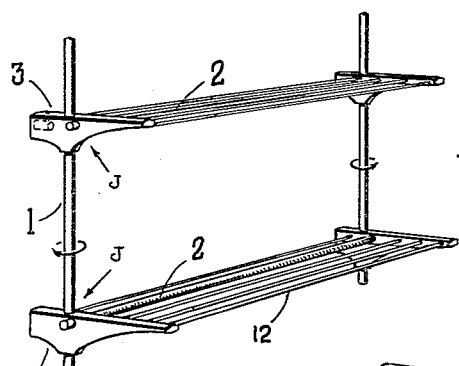
Fig.5
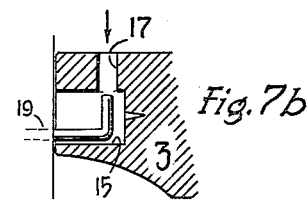
Fig.7b
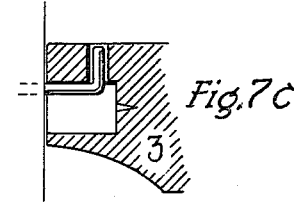
Fig.7c
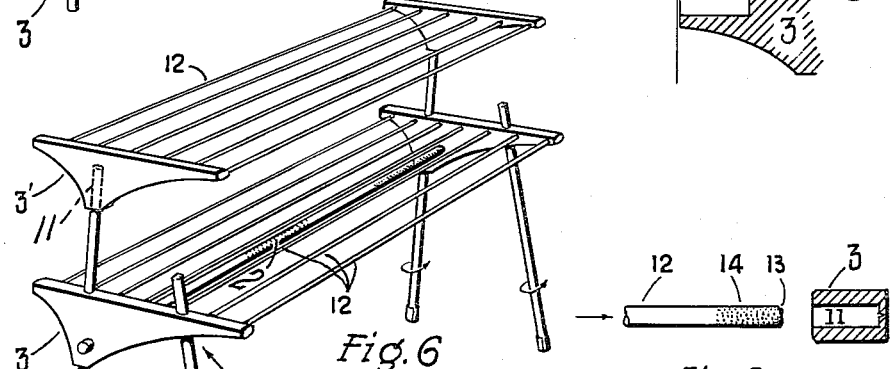
Fig.6
Fig.8
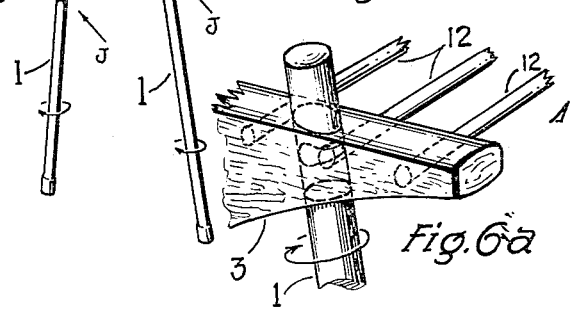
Fig.6a
ALEXANDER DRESDNER
INVENTOR
Pierre Lespérance
AGENT

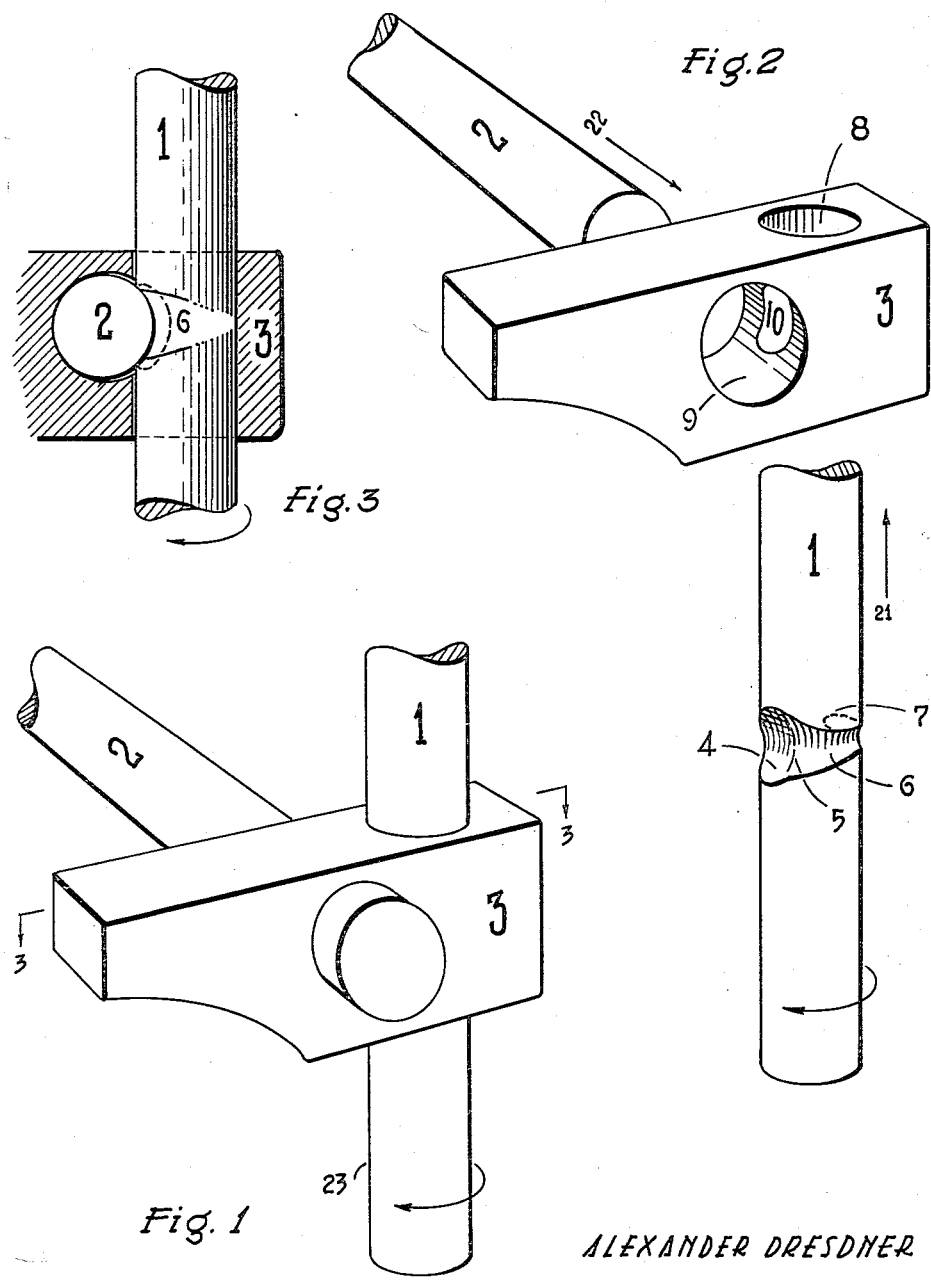

United States Patent Office 3,118,543
Patented Jan. 21, 1964

3,118,543
INDUSTRIAL JOINT FURNITURE KIT
Alexander Dresdner, 4630 De Carie Blvd., Apt. 11,
Montreal 29, Quebec, Canada
Filed May 26, 1961, Ser. No. 112,938
6 Claims. (Cl. 211—90)

This invention generally relates to industrial joints and more particularly to a joint to be used in the construction of light furniture kits, such as book-shelves, magazine-racks and coat-hangers and the like.

One object of the invention is to provide a joint which is simple in construction, easy to use, well adapted for its intended purposes and inexpensive to manufacture.

The main object of the invention is to provide a novel joint by which a structure of a sturdy unit of furniture kit can be easily and completely assembled without special skill, without tools, glue, screws or nails, by the consumer himself.

Another object of the invention is to provide a joint as being an integral part and grown out of the same elements which compose that structure.

Still another object of the invention is to provide a joint enabling the design of furniture using less material for the same size and scope as that for a conventional piece and at the same time to be as functional as aesthetical.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 shows a perspective of the joint constructed in accordance with the invention.

FIGURE 2 shows an exploded view of FIGURE 1, with all the details.

FIGURE 3 is a vertical section taken along line 3—3 of FIGURE 1.

FIGURE 4 is a perspective of a furniture kit designed and assembled exclusively in accordance with the invention and forming a coat-hanger, where the key members serve as braces.

FIGURE 5 is a perspective of another embodiment of a furniture kit designed and assembled exclusively in accordance with the invention where the key members serve as hangers.

FIGURE 6 is a perspective of a still another embodiment of a furniture kit designed and assembled exclusively in accordance with the invention and forming a combination magazine-rack, where the key members serve as legs.

FIGURE 6a is a perspective view on an enlarged scale of a part of the embodiment of FIGURE 6.

FIGURES 7a, 7b and 7c are sections of the part of FIGURE 4 indicated by arrow lines 7 showing three steps of the method for hanging the furniture kit on a wall; and FIGURE 8 is a vertical section of the part of FIGURE 4 indicated by arrow lines 8 showing the fitting of the rod ends.

Referring now more particularly to the drawings in which like reference characters indicate like elements throughout, the joint of the present invention is more particularly illustrated in FIGURES 1, 2 and 3. In said figures, there is shown a cylindrical key rod 1, another cylindrical rod 2 and a connector member 3. The key rod 1 is provided with a half round notch 4 having a radius of curvature substantially equal to the radius of rod 2. Notch 4 is extended on one side thereof by a peripherally extending tapered groove 6 which joins with the notch 4 at 5 and terminates at 7 whereby notch 4 and groove 6 extend about three-quarters around the key rod 1. Rod 2 forms a tie rod and has no notches and may have a diameter equal to or different from that of key member 1.

Connector element 3 is in the form of a block with a pair of holes 8 and 9 which may be through bores or blind bores and intercepting each other at substantially right angles with their center lines in offset relation and at a distance from each other less than the sum of the radii of the holes whereby the holes are in communication with each other within the connector element 3 to define opening 10.

Hole 8 is adapted to receive key rod 1 and hole 9 to receive tie rod 2. Said holes have a diameter adapted to receive with a relatively loose fit the respective rods 1 and 2.

To make the joint, key rod 1 is first pushed through hole 8 of connector element 3 as indicated by arrow 21 until notch 4 of member 1 is disposed facing opening 10. Then, tie rod 2 is pushed through hole 9 to any desired extent in accordance with arrow 22 so that any portion of its length is in engagement with notch 4 of key rod 1. Key rod 1 is then rotated in the direction indicated by arrow 23, in FIGURE 1, that is to bring groove 6 in contact with rod 2. Thus, a wedging action is obtained between the two rods 1 and 2 which are thus firmly secured within connector element 3. An indentation is formed in the contacting surfaces of both the tie rod 2 and the bottom of the groove 6 of key rod 1, thus, positively preventing unlocking of the joint.

FIGURES 4 to 8 inclusive represent typical applications of the joints described hereinabove. FIGURE 4 represents a coat hanger in which tie rod 2 connects two spaced connector elements 3 which support a shelf structure consisting of a plurality of spaced cylindrical rods 12, the bevelled ends 13 of which are tightly fitted within blind bores 11 of connector elements 3.

In order to increase the co-efficient of friction between rods 12 and bores 11 of member 3, and also in order to prevent shrinking of the ends of wooden rods 12, the end portions of said rods 12 are treated with a solution of collophony or similar friction increasing and wood shrinking preventive composition, as indicated at 14 in FIGURE 8.

The key rods 1 for each joint J depend downwardly and rearward from the connector members 3 and serve as braces to hang the coat hanger from a wall.

A preferred way of hooking the coat hanger on a wall is more particularly illustrated in FIGURES 7a, 7b and 7c. The connector element 3 is provided at its back edge face 16 with a blind bore 15 of a depth and diameter to freely receive an L-shaped hook 19 protruding from the wall. Blind bore 15 is spaced downwardly from the rear top corner 18 of the connector element 3 a distance greater than the length of the vertical leg of L-shaped hook 19. Connector element 3 is further provided with a hole 17 in communication with bore 15 near the bottom of the latter. To hook the coat hanger, the bores 15 of the connector elements 3 are brought into alignment with the hooks 19 and the hooks made to enter bores 15 until their vertical leg is opposite vertical holes 17, then the connector elements are simply dropped onto the hook whereby the vertical legs of the latter engage the holes 17, as shown in FIGURE 7c.

The key rods 1 bear against the wall below the connector members 3 to maintain the coat hanger in substantially horizontal position.

FIGURE 5 shows another embodiment of a furniture kit assembled with the joints of the present invention and forming a pair of superposed shelves. In this embodiment, there is provided a top pair of connector elements 3 interconnected by a tie rod 2 and supporting a shelf structure consisting of spaced rods 12 as in FIGURE 4, and a bottom pair of connector elements 3 interconnected by a tie rod 2 and supporting a shelf structure consisting of spaced rods 12, as in FIGURE 4. The superposed pairs of connector elements 3 are joined by a common key rod 1 inserted through aligned vertical holes 8 made in the respective connector elements 3. The key rods 1 are in this case each provided with a pair of spaced notches 4 and associated tapered grooves 6 and are adapted to coact with tie-rods 2 of each shelf structure.

FIGURES 6 and 7a show still another embodiment of a furniture kit in accordance with the present invention forming a combination magazine rack, including two superposed shelf structures. The topmost shelf structure comprises blocks 3' and a plurality of spaced rods 12 fitted within bores 11 of blocks 3', as in the embodiment of FIGURE 4. The blocks 3' are provided with blind bores in which are fitted the top ends of key members 1 which serve as the back legs for the structure. A lower pair of connector elements 3 have their through bores 8 receiving the rear legs 1 in coaction with a tie rod 2 to form the joint J in accordance with the invention. The front portion of the connector elements 3 are further provided with a pair of holes 8 and 9 whereby front leg 1 forms a joint J in coaction with the second rod 12 from the front of the lower shelf structure.

All the articles of furniture using the joints in accordance with the invention are very easily assembled from separate parts without the use of tools, glue, screws, or nails, by persons not skilled in the art.

While preferred embodiments in accordance with the invention have been illustrated and described, it is understood that various modifications may be resorted to without departing from the spirit and scope of the appended claims.

Having thus completely and fully described the invention, what is now claimed as new is as follows:

1. A joint for use in articles of furniture and the like comprising a connector element having a pair of cylindrical holes intersecting each other at substantially right angles, with the center lines of the holes being in offset relation and at a distance from each other less than the sum of the radii of said holes whereby said holes are in communication with each other in said element, a first cylindrical rod inserted within and fitting one of said holes, and a second cylindrical rod inserted within and fitting the other of said holes, said first cylindrical rod having a notch of rounded cross-section of a radius substantially equal to that of said second rod and having its axis substantially at right angles to the axis of said first rod, said notch having a depth to freely receive said second rod when both rods are inserted within their respective holes, said first rod further having a peripheral tapered groove forming a continuation of said notch and progressively decreasing in depth in a direction away from said notch, whereby rotation of said first rod within said element will cause wedging engagement of said second rod with said groove of said first rod to thereby lock said two rods with each other and with said element.

2. A joint as claimed in claim 1, wherein said holes are through bores opening at opposite faces of said connector element.

3. An article of furniture comprising a pair of spacedly disposed connector elements, shelf-like structure supported by said connector elements, each connector element having a pair of cylindrical holes intersecting each other at substantially right angles with the center lines of the holes being in offset relation and at a distance from each other less than the sum of the radii of said holes, whereby said holes are in communication with each other in said connector element, a cylindrical tie-rod inserted within and fitting one of the holes of each element at both ends thereof, and second cylindrical rods each inserted within and fitting the other of the holes of the respective elements, said second rods serving as support for said article of furniture, each said support rod having a notch of rounded cross-section of a radius substantially equal to that of said tie-rod and having its axis substantially at right angles to the longitudinal axis of said support rods, said notch having a depth to freely receive said tie-rod, said support rods each further having a peripheral tapered groove forming a continuation of said notch and progressively decreasing in depth in a direction away from said notch whereby rotation of said support rods within their respective connector elements will cause wedging engagement of said tie-rod with the groove of the respective support rods to thereby lock all of said rods with the two connector elements.

4. An article of furniture as in claim 3, wherein said shelf-like structure consists of spaced rods fitted within blind bores made in the respective connector elements, the ends of the spaced rods being treated with a friction increasing and wood shrinking preventive composition.

5. An article of furniture as claimed in claim 3, further including a second pair of spaced connector elements, each having a pair of cylindrical holes intersecting each other at substantially right angles with the center lines of the holes being in offset relation and spaced from each other a distance less than the sum of the radii of said holes whereby said holes are in communication with each other in said second pair of connector elements, a second cylindrical tie rod fitting within holes of the connector elements of said second pair, said support rods each further having a second notch longitudinally spaced from said first named notch and of rounded cross section of a radius equal to that of the second tie rod and having its axis at substantially right angles to the longitudinal axis of said support rods, said second notches having a depth to freely receive said second tie rod, said support rods each further having a peripheral tapered groove forming a continuation of said second notches and progressively decreasing in depth in a direction away from said second notches, whereby rotation of said support rods within the connector elements will cause wedging engagement of said first and second tie rods with the grooves of each of said support rods to thereby lock all of said rods with the respective connector elements.

6. An article of furniture as claimed in claim 5, wherein said connector elements each has a blind bore made therein and opening at the back end face thereof to freely receive an L-shaped hook secured to a wall, a hole opening in said blind bore near the bottom thereof to receive the vertical leg of said hook.

References Cited in the file of this patent

UNITED STATES PATENTS

| | | |
|---|---|---|
| 426,313 | Paxson | Apr. 22, 1890 |
| 651,264 | Nutz | June 5, 1900 |
| 927,235 | Hamm | July 6, 1909 |
| 941,483 | Williams | Nov. 30, 1909 |
| 1,569,136 | Pardee | Jan. 12, 1926 |
| 1,664,103 | Bishoff | Mar. 27, 1928 |